(12) United States Patent
Moriyama et al.

(10) Patent No.: US 12,531,817 B2
(45) Date of Patent: *Jan. 20, 2026

(54) RESOURCE MANAGEMENT

(71) Applicant: Honda Motor Co., Ltd., Tokyo (JP)

(72) Inventors: Koji Moriyama, Rancho Palos Verdes, CA (US); Richard Y. Asato, Torrance, CA (US); Ryosuke Shibata, Saitama (JP); Brian Moran, Rancho Santa Margarita, CA (US); Xiaojian Yang, Anaheim, CA (US)

(73) Assignee: Honda Motor Co., Ltd., Tokyo (JP)

( * ) Notice: Subject to any disclaimer, the term of this patent is extended or adjusted under 35 U.S.C. 154(b) by 103 days.

This patent is subject to a terminal disclaimer.

(21) Appl. No.: 18/392,518

(22) Filed: Dec. 21, 2023

(65) Prior Publication Data
US 2024/0323146 A1    Sep. 26, 2024

Related U.S. Application Data

(63) Continuation of application No. 18/188,547, filed on Mar. 23, 2023, now Pat. No. 12,101,261, and a continuation of application No. 18/188,793, filed on Mar. 23, 2023, now Pat. No. 11,916,810.

(51) Int. Cl.
*H04L 47/70*  (2022.01)
*H04L 47/762*  (2022.01)

(52) U.S. Cl.
CPC .......... *H04L 47/827* (2013.01); *H04L 47/762* (2013.01); *H04L 47/822* (2013.01)

(58) Field of Classification Search
CPC .... H04L 47/827; H04L 47/762; H04L 47/822

USPC .......................................................... 709/226
See application file for complete search history.

(56) References Cited

U.S. PATENT DOCUMENTS

| | | | |
|---|---|---|---|
| 6,571,215 B1 * | 5/2003 | Mahapatro | G06Q 10/0631 707/999.01 |
| 9,705,895 B1 * | 7/2017 | Gutzmann | H04L 63/1408 |
| 9,898,315 B1 * | 2/2018 | Li | G06F 9/45533 |
| 10,031,785 B2 * | 7/2018 | Gonzalez | H04L 47/83 |
| 10,812,482 B1 | 10/2020 | Xu et al. | |
| 11,036,537 B1 | 6/2021 | Quinn et al. | |
| 2005/0044202 A1 * | 2/2005 | Shirota | H04L 43/00 709/223 |

(Continued)

OTHER PUBLICATIONS

Office Action of U.S. Appl. No. 18/188,547 dated Feb. 15, 2024, 22 pages.

(Continued)

*Primary Examiner* — Tauqir Hussain
(74) *Attorney, Agent, or Firm* — Rankin, Hill & Clark LLP

(57) ABSTRACT

According to one aspect, a system for resource management may perform receiving a total resource request, a vector of two or more maximum available resources associated with two or more corresponding resource providers, and a number of resource providers and calculating an individual resource request for each of the two or more resource providers by iteratively comparing the vector of two or more maximum available resources with a vector of a current average resource residual, taking a minimum between those vectors as a running tally for the individual resource requests, and recalculating the current average resource residual.

21 Claims, 9 Drawing Sheets

(56) References Cited

U.S. PATENT DOCUMENTS

| | | | | |
|---|---|---|---|---|
| 2006/0140115 | A1* | 6/2006 | Timus | H04L 47/10 |
| | | | | 370/252 |
| 2008/0062437 | A1* | 3/2008 | Rizzo | H04N 1/393 |
| | | | | 358/1.2 |
| 2009/0119237 | A1* | 5/2009 | Triantafillidis | H04L 47/83 |
| | | | | 703/2 |
| 2009/0163223 | A1* | 6/2009 | Casey | H04W 36/22 |
| | | | | 455/453 |
| 2011/0218849 | A1* | 9/2011 | Rutigliano | G06Q 30/0224 |
| | | | | 705/16 |
| 2014/0064200 | A1* | 3/2014 | Oh | H04W 72/541 |
| | | | | 370/329 |
| 2015/0236724 | A1* | 8/2015 | Reinart | G06F 11/1076 |
| | | | | 714/774 |
| 2018/0026891 | A1* | 1/2018 | Vasseur | H04L 47/25 |
| | | | | 370/235 |
| 2019/0199611 | A1* | 6/2019 | Kotadia | H04L 43/0817 |
| 2021/0019160 | A1* | 1/2021 | Pan | G06F 9/5072 |
| 2021/0042719 | A1* | 2/2021 | Proud | G06Q 20/102 |
| 2021/0176174 | A1* | 6/2021 | Chou | H04L 67/1008 |
| 2021/0382757 | A1* | 12/2021 | Azuma | G06F 9/505 |
| 2021/0406815 | A1* | 12/2021 | Mimassi | G06Q 10/063118 |
| 2022/0138786 | A1* | 5/2022 | Sawarkar | H04L 47/83 |
| | | | | 705/7.35 |
| 2023/0186281 | A1* | 6/2023 | Todasco | G06Q 20/38215 |
| | | | | 705/64 |
| 2023/0247143 | A1* | 8/2023 | Gustof | G10L 15/1815 |
| | | | | 379/202.01 |

OTHER PUBLICATIONS

Notice of Allowance of U.S. Appl. No. 18/188,547 dated May 28, 2024, 7 pages.

* cited by examiner

RESOURCE MANAGEMENT

CROSS-REFERENCE TO RELATED APPLICATIONS

This application is a continuation application of U.S. Non-provisional patent application Ser. No. 18/188,793 entitled RESOURCE MANAGEMENT filed Mar. 23, 2023 which in itself claims priority to U.S. Non-provisional patent application Ser. No. 18/188,547 entitled RESOURCE MANAGEMENT, filed on Mar. 23, 2023; the entirety of both the above-noted applications are incorporated by reference herein.

BACKGROUND

Resource allocation may be a problem where distribution of resources may be requested among a set of limited providers. One example may be a "dinner problem" which represents a problem as to how to best divide the payment of the bill in a fairest manner among guests with differing abilities to pay. The "dinner problem" analogy may be applied to any integer set of resource providers which may have sufficient, adequate, or insufficient means to provide resources.

BRIEF DESCRIPTION

According to one aspect, a system for resource management may include a memory and a processor. The memory may store one or more instructions. The processor may execute one or more of the instructions stored on the memory to perform one or more acts, one or more actions, one or more steps, etc. For example, the processor may perform receiving a total resource request, a vector of two or more maximum available resources associated with two or more corresponding resource providers, and a number of resource providers and calculating an individual resource request for each of the two or more resource providers based on a classification number. Any resource provider having a maximum available resource less than or equal to the classification number may be assigned an individual resource request equal to their corresponding maximum available resource.

The remaining resource providers having a maximum available resource greater than the classification number may be assigned individual resource requests which evenly split the total resource request minus maximum available resources for the resource providers having the maximum available resource less than or equal to the classification number. The individual resource request for each of the two or more resource providers may be set to the corresponding maximum available resources when a sum of the vector of two or more maximum available resources is less than the total resource request. The individual resource request for each of the two or more resource providers may be equal when possible.

The classification number may be calculated by sorting the vector of two or more maximum available resources. The classification number may be calculated by generating a number of dimension vectors equal to the number of resource providers based on the sorted vector of two or more maximum available resources. The classification number may be calculated by generating an updated dimension vector based on the number of dimension vectors. The updated dimension vector may be a monotonically increasing vector.

According to one aspect, a system for resource management may include a memory and a processor. The memory may store one or more instructions. The processor may execute one or more of the instructions stored on the memory to perform one or more acts, one or more actions, one or more steps, etc. For example, the processor may perform receiving a total resource request, a vector of two or more maximum available resources associated with two or more corresponding resource providers, and a number of resource providers, calculating an individual resource request for each of the two or more resource providers based on a classification number, and implementing the individual resource request for each of the two or more resource providers to draw the corresponding resources from each of the two or more resource providers. Any resource provider having a maximum available resource less than or equal to the classification number may be assigned an individual resource request equal to their corresponding maximum available resource.

The remaining resource providers having a maximum available resource greater than the classification number may be assigned individual resource requests which evenly split the total resource request minus maximum available resources for the resource providers having the maximum available resource less than or equal to the classification number. The individual resource request for each of the two or more resource providers may be set to the corresponding maximum available resources when a sum of the vector of two or more maximum available resources is less than the total resource request. The individual resource request for each of the two or more resource providers may be equal when possible.

The classification number may be calculated by sorting the vector of two or more maximum available resources. The classification number may be calculated by generating a number of dimension vectors equal to the number of resource providers based on the sorted vector of two or more maximum available resources. The classification number may be calculated by generating an updated dimension vector based on the number of dimension vectors. The updated dimension vector may be a monotonically increasing vector.

According to one aspect, a computer-implemented method for resource management may include receiving a total resource request, a vector of two or more maximum available resources associated with two or more corresponding resource providers, and a number of resource providers, calculating an individual resource request for each of the two or more resource providers based on a classification number, and implementing the individual resource request for each of the two or more resource providers to draw the corresponding resources from each of the two or more resource providers. Any resource provider having a maximum available resource less than or equal to the classification number may be assigned an individual resource request equal to their corresponding maximum available resource.

The remaining resource providers having a maximum available resource greater than the classification number may be assigned individual resource requests which evenly split the total resource request minus maximum available resources for the resource providers having the maximum available resource less than or equal to the classification number. The individual resource request for each of the two or more resource providers may be set to the corresponding maximum available resources when a sum of the vector of two or more maximum available resources is less than the total resource request. The individual resource request for each of the two or more resource providers may be equal when possible.

According to one aspect, a system for resource management may include a memory and a processor. The memory may store one or more instructions. The processor may execute one or more of the instructions stored on the memory to perform one or more acts, one or more actions, one or more steps, etc. For example, the processor may perform receiving a total resource request, a vector of two or more maximum available resources associated with two or more corresponding resource providers, and a number of resource providers and calculating an individual resource request for each of the two or more resource providers by iteratively comparing the vector of two or more maximum available resources with a vector of a current average resource residual, taking a minimum between those vectors as a running tally for the individual resource requests, and recalculating the current average resource residual.

The individual resource request for each of the two or more resource providers may be set to the corresponding maximum available resources when a sum of the vector of two or more maximum available resources is less than the total resource request. The individual resource request for each of the two or more resource providers may be equal when possible. The current average resource residual may be initialized as zero. The calculating the individual resource request for each of the two or more resource providers may be associated with an iterative threshold. The iterative threshold may be two iterations or three iterations.

According to one aspect, a system for resource management may include a memory and a processor. The memory may store one or more instructions. The processor may execute one or more of the instructions stored on the memory to perform one or more acts, one or more actions, one or more steps, etc. For example, the processor may perform receiving a total resource request, a vector of two or more maximum available resources associated with two or more corresponding resource providers, and a number of resource providers, calculating an individual resource request for each of the two or more resource providers by iteratively comparing the vector of two or more maximum available resources with a vector of a current average resource residual, taking a minimum between those vectors as a running tally for the individual resource requests, and recalculating the current average resource residual, and implementing the individual resource request for each of the two or more resource providers to draw the corresponding resources from each of the two or more resource providers.

The individual resource request for each of the two or more resource providers may be set to the corresponding maximum available resources when a sum of the vector of two or more maximum available resources is less than the total resource request. The individual resource request for each of the two or more resource providers may be equal when possible. The current average resource residual may be initialized as zero. The calculating the individual resource request for each of the two or more resource providers may be associated with an iterative threshold. The iterative threshold may be two iterations or three iterations.

According to one aspect, a computer-implemented method for resource management may include executing a first method for resource management or a second first method for resource management based on available computer processing resources. The first method for resource management may include receiving a total resource request, a vector of two or more maximum available resources associated with two or more corresponding resource providers, and a number of resource providers, calculating an individual resource request for each of the two or more resource providers by iteratively comparing the vector of two or more maximum available resources with a vector of a current average resource residual, taking a minimum between those vectors as a running tally for the individual resource requests, and recalculating the current average resource residual, and implementing the individual resource request for each of the two or more resource providers to draw the corresponding resources from each of the two or more resource providers. The second method for resource management may include receiving the total resource request, the vector of two or more maximum available resources associated with two or more corresponding resource providers, and the number of resource providers, calculating the individual resource request for each of the two or more resource providers based on a classification number, and implementing the individual resource request for each of the two or more resource providers to draw the corresponding resources from each of the two or more resource providers. Any resource provider having a maximum available resource less than or equal to the classification number may be assigned an individual resource request equal to their corresponding maximum available resource.

The individual resource request for each of the two or more resource providers may be set to the corresponding maximum available resources when a sum of the vector of two or more maximum available resources is less than the total resource request. The individual resource request for each of the two or more resource providers may be equal when possible. The current average resource residual may be initialized as zero. The calculating the individual resource request for each of the two or more resource providers may be associated with an iterative threshold. The iterative threshold may be two iterations or three iterations.

The remaining resource providers having a maximum available resource greater than the classification number may be assigned individual resource requests which evenly split the total resource request minus maximum available resources for the resource providers having the maximum available resource less than or equal to the classification number. The individual resource request for each of the two or more resource providers may be set to the corresponding maximum available resources when a sum of the vector of two or more maximum available resources is less than the total resource request.

DETAILED DESCRIPTION

Figure 1:
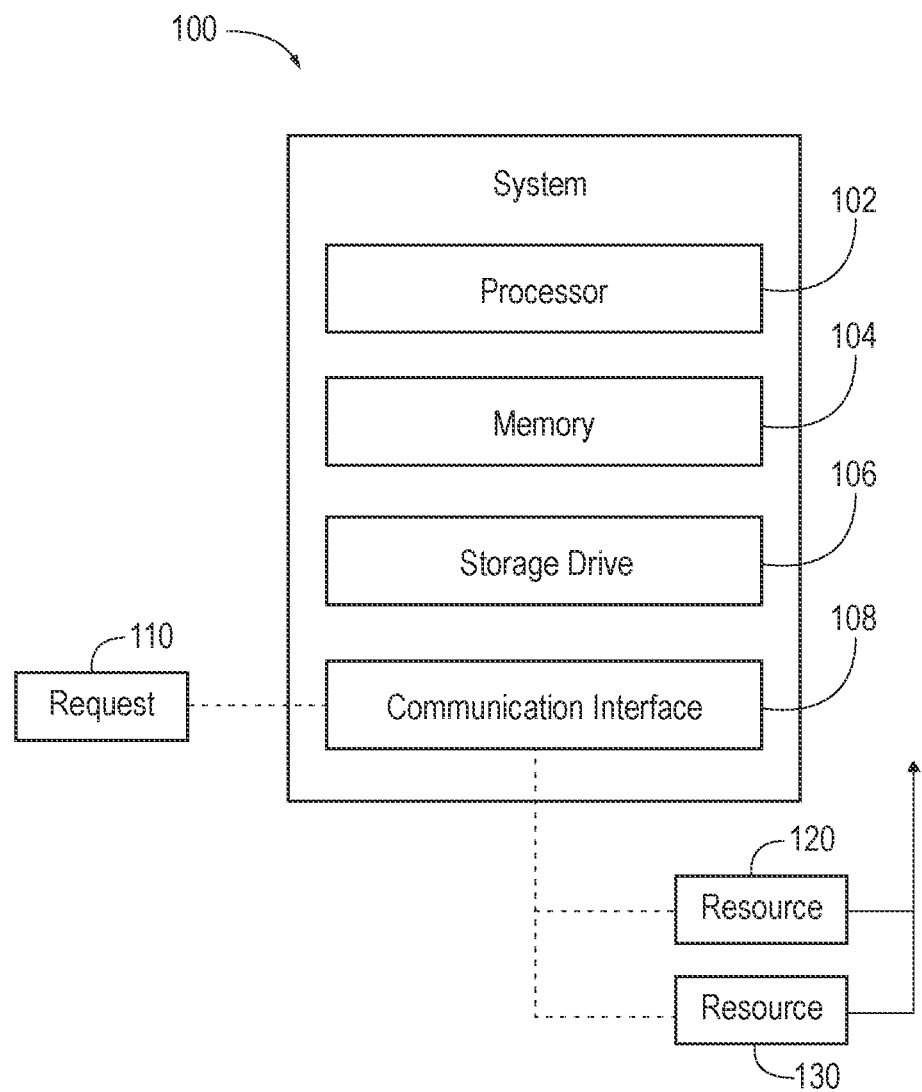
FIG. 1 is an exemplary component diagram of a system for resource management, according to one aspect.

The following includes definitions of selected terms employed herein. The definitions include various examples and/or forms of components that fall within the scope of a term and that may be used for implementation. The examples are not intended to be limiting. Further, one having ordinary skill in the art will appreciate that the components discussed herein, may be combined, omitted or organized with other components or organized into different architectures.

A "processor", as used herein, processes signals and performs general computing and arithmetic functions. Signals processed by the processor may include digital signals, data signals, computer instructions, processor instructions, messages, a bit, a bit stream, or other means that may be received, transmitted, and/or detected. Generally, the processor may be a variety of various processors including multiple single and multicore processors and co-processors and other multiple single and multicore processor and co-processor architectures. The processor may include various modules to execute various functions.

A "memory", as used herein, may include volatile memory and/or non-volatile memory. Non-volatile memory may include, for example, ROM (read only memory), PROM (programmable read only memory), EPROM (erasable PROM), and EEPROM (electrically erasable PROM). Volatile memory may include, for example, RAM (random access memory), synchronous RAM (SRAM), dynamic RAM (DRAM), synchronous DRAM (SDRAM), double data rate SDRAM (DDRSDRAM), and direct RAM bus RAM (DRRAM). The memory may store an operating system that controls or allocates resources of a computing device.

A "disk" or "drive", as used herein, may be a magnetic disk drive, a solid state disk drive, a floppy disk drive, a tape drive, a Zip drive, a flash memory card, and/or a memory stick. Furthermore, the disk may be a CD-ROM (compact disk ROM), a CD recordable drive (CD-R drive), a CD rewritable drive (CD-RW drive), and/or a digital video ROM drive (DVD-ROM). The disk may store an operating system that controls or allocates resources of a computing device.

A "bus", as used herein, refers to an interconnected architecture that is operably connected to other computer components inside a computer or between computers. The bus may transfer data between the computer components. The bus may be a memory bus, a memory controller, a peripheral bus, an external bus, a crossbar switch, and/or a local bus, among others.

A "database", as used herein, may refer to a table, a set of tables, and a set of data stores (e.g., disks) and/or methods for accessing and/or manipulating those data stores.

An "operable connection", or a connection by which entities are "operably connected", is one in which signals, physical communications, and/or logical communications may be sent and/or received. An operable connection may include a wireless interface, a physical interface, a data interface, and/or an electrical interface.

A "computer communication", as used herein, refers to a communication between two or more computing devices (e.g., computer, personal digital assistant, cellular telephone, network device) and may be, for example, a network transfer, a file transfer, an applet transfer, an email, a hypertext transfer protocol (HTTP) transfer, and so on. A computer communication may occur across, for example, a wireless system (e.g., IEEE 802.11), an Ethernet system (e.g., IEEE 802.3), a token ring system (e.g., IEEE 802.5), a local area network (LAN), a wide area network (WAN), a point-to-point system, a circuit switching system, a packet switching system, among others.

A "mobile device", as used herein, may be a computing device typically having a display screen with a user input (e.g., touch, keyboard) and a processor for computing. Mobile devices include handheld devices, portable electronic devices, smart phones, laptops, tablets, and e-readers.

The aspects discussed herein may be described and implemented in the context of non-transitory computer-readable storage medium storing computer-executable instructions. Non-transitory computer-readable storage media include computer storage media and communication media. For example, flash memory drives, digital versatile discs (DVDs), compact discs (CDs), floppy disks, and tape cassettes. Non-transitory computer-readable storage media may include volatile and non-volatile, removable and non-removable media implemented in any method or technology for storage of information such as computer readable instructions, data structures, modules, or other data.

As discussed above, resource allocation may be a problem where distribution of resources is requested among a set of limited providers. One example may be a "dinner problem" which represents a problem as to how to best divide the payment of the bill in a fairest manner among guests with differing abilities to pay. The "dinner problem" analogy may be applied to any integer set of resource providers which may have sufficient, adequate, or insufficient means to provide resources. Two different approaches are discussed herein, including a sort and settle methodology and a residual redistribution methodology.

It may be assumed that a total resource request (e.g., the bill in the "dinner problem"), a vector of two or more maximum available resources (e.g., pocket money for each individual in the "dinner problem" or the L vector, indicative of resource distributions limitations for each resource provider) associated with two or more corresponding resource providers, and a number of resource providers (e.g., the number of guests in the "dinner problem") are known. Additionally, a cost function may be considered to be optimal when each resource provider provides an equal amount of resource (e.g., pays an equal amount toward the bill in the "dinner problem").

FIG. 1 is an exemplary component diagram of a system 100 for resource management, according to one aspect. The system 100 for resource management may include a processor 102, a memory 104, a storage drive 106, and a communication interface 108. The communication interface 108 may receive a total resource request 110 (e.g., from a remote server, for example). The system 100 for resource management may manage two or more resource providers 120, 130 (e.g., first resource provider 120, second resource provider 130, etc.) associated with two or more maximum available resources. Each of the components of the system 100 for resource management may be in computer communication with one another and/or operably connected (e.g., via a bus or a wireless connection, etc.).

Sort and Settle

According to one aspect, a system 100 for resource management may include the memory 104 and the processor 102. The memory 104 may store one or more instructions. The processor 102 may execute one or more of the instructions stored on the memory 104 to perform one or more acts, one or more actions, one or more steps, etc. For example, the processor 102 may perform receiving a total resource request P (e.g., may be a scalar value), a vector or array of two or more maximum available resources associated with two or more corresponding resource providers, and a number N of resource providers, calculating an individual resource request for each of the two or more resource providers based on a classification number (e.g., may be output as a vector or array), and implementing the individual resource request for each of the two or more resource providers to draw the corresponding resources from each of the two or more resource providers.

Any resource provider having a maximum available resource less than or equal to the classification number may be assigned an individual resource request equal to their corresponding maximum available resource. The remaining resource providers having a maximum available resource greater than the classification number may be assigned individual resource requests which evenly split the total resource request minus maximum available resources for the resource providers having the maximum available resource less than or equal to the classification number.

The classification number may be calculated by sorting the vector of two or more maximum available resources. The classification number may be calculated by generating a number of dimension vectors equal to the number of resource providers based on the sorted vector of two or more maximum available resources. The classification number may be calculated by generating an updated dimension vector based on the number of dimension vectors. The updated dimension vector may be a monotonically increasing vector.

According to one aspect, the individual resource request for each of the two or more resource providers may be set to the corresponding maximum available resources when a sum of the vector of two or more maximum available resources is less than the total resource request (e.g., the guests of the "dinner problem" don't have enough to pay the bill).

As discussed above, the cost function may be considered to be optimal when each resource provider provides an equal amount of resources (e.g., pays an equal amount toward the bill in the "dinner problem"). In other words, $P_o=P/N$ is the average, and may be considered as the most fair or fairest. In this way, the individual resource request for each of the two or more resource providers may be set to be equal when possible.

Residual Redistribution

According to one aspect, the processor 102 may perform receiving a total resource request P, a vector of two or more maximum available resources associated with two or more corresponding resource providers, and a number N of resource providers, calculating an individual resource request for each of the two or more resource providers by iteratively comparing the vector of two or more maximum available resources with a vector of a current average resource residual, taking a minimum between those vectors as a running tally for the individual resource requests, and recalculating the current average resource residual, and implementing the individual resource request for each of the two or more resource providers to draw the corresponding resources from each of the two or more resource providers. In other words, $$P_{k+1} = \min\left(P_k + \frac{R}{N}, L\right),$$

where R may be the current resource residual and a scalar, R/N may represent the current average resource residual, k+1 may be a next N iteration, k may be a current iteration, $P_{k+1}$, $P_k$, L may be vectors of length N, N may be the number of resource providers (e.g., the dinner guests), R=$P_0$−sum ($P_k$) (e.g., the residual).

The current resource residual R and the current average resource residual R/N may be initialized as zero. As the calculations progress, residuals may be collected and redistributed. After merely a few iterations, residuals may be redistributed evenly and each resource producer applies least and up to most possible. Advantages of residual redistribution include efficient and/or minimal computing power utilized and an extremely fast convergence time. The calculating of the individual resource request for each of the two or more resource providers may be associated with an iterative threshold. The iterative threshold may be two iterations or three iterations.

According to one aspect, the system 100 for resource management may select and execute a first method for resource management (e.g., the above discussed Sort and Settle Methodology) or a second first method for resource management (e.g., the above discussed Residual Redistribution Methodology) based on available computer processing resources of the system.

In this regard, the first method for resource management may include receiving a total resource request, a vector of two or more maximum available resources associated with two or more corresponding resource providers, and a number of resource providers, calculating an individual resource request for each of the two or more resource providers by iteratively comparing the vector of two or more maximum available resources with a vector of a current average resource residual, taking a minimum between those vectors as a running tally for the individual resource requests, and recalculating the current average resource residual, and implementing the individual resource request for each of the two or more resource providers to draw the corresponding resources from each of the two or more resource providers.

The second method for resource management may include receiving the total resource request, the vector of two or more maximum available resources associated with two or more corresponding resource providers, and the number of resource providers, calculating the individual resource request for each of the two or more resource providers based on a classification number, and implementing the individual resource request for each of the two or more resource providers to draw the corresponding resources from each of the two or more resource providers. Any resource provider having a maximum available resource less than or equal to the classification number may be assigned an individual resource request equal to their corresponding maximum available resource.

Figure 2:
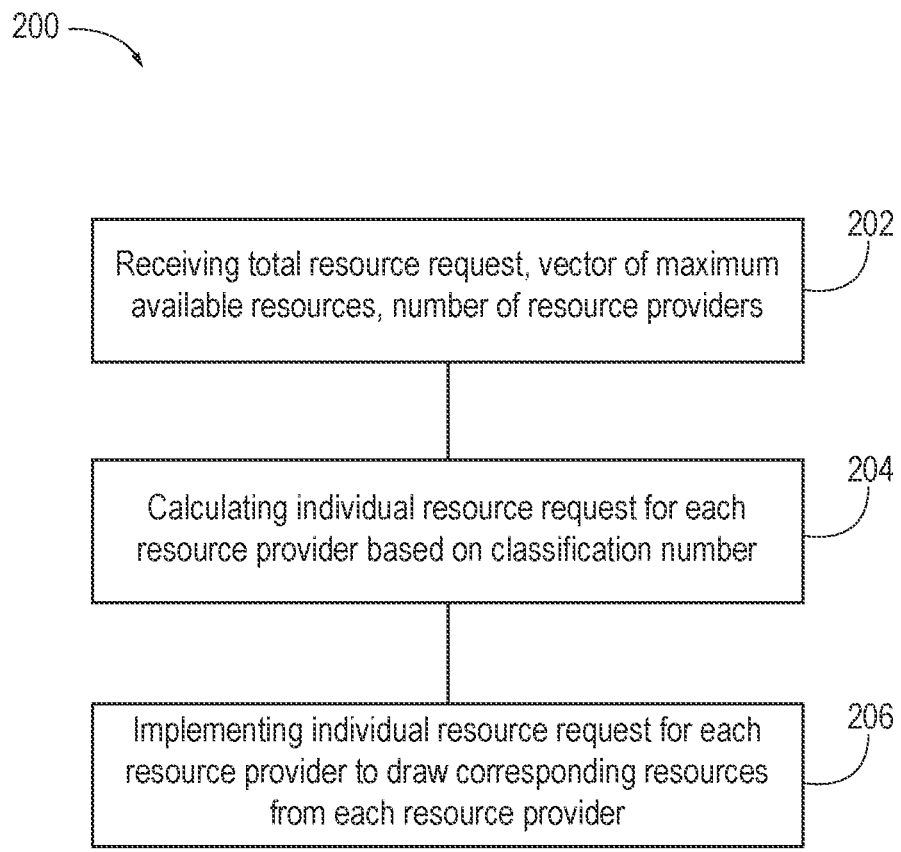
FIG. 2 is an exemplary flow diagram of a method for resource management, according to one aspect.

FIG. 2 is an exemplary flow diagram of a method for resource management, according to one aspect. According to one aspect, a computer-implemented method 200 for resource management may include receiving 202 a total resource request, a vector of two or more maximum available resources associated with two or more corresponding resource providers, and a number of resource providers, calculating 204 an individual resource request for each of the two or more resource providers based on a classification number, and implementing 206 the individual resource request for each of the two or more resource providers to draw the corresponding resources from each of the two or more resource providers. Any resource provider having a maximum available resource less than or equal to the classification number may be assigned an individual resource request equal to their corresponding maximum available resource.

Figure 3A:
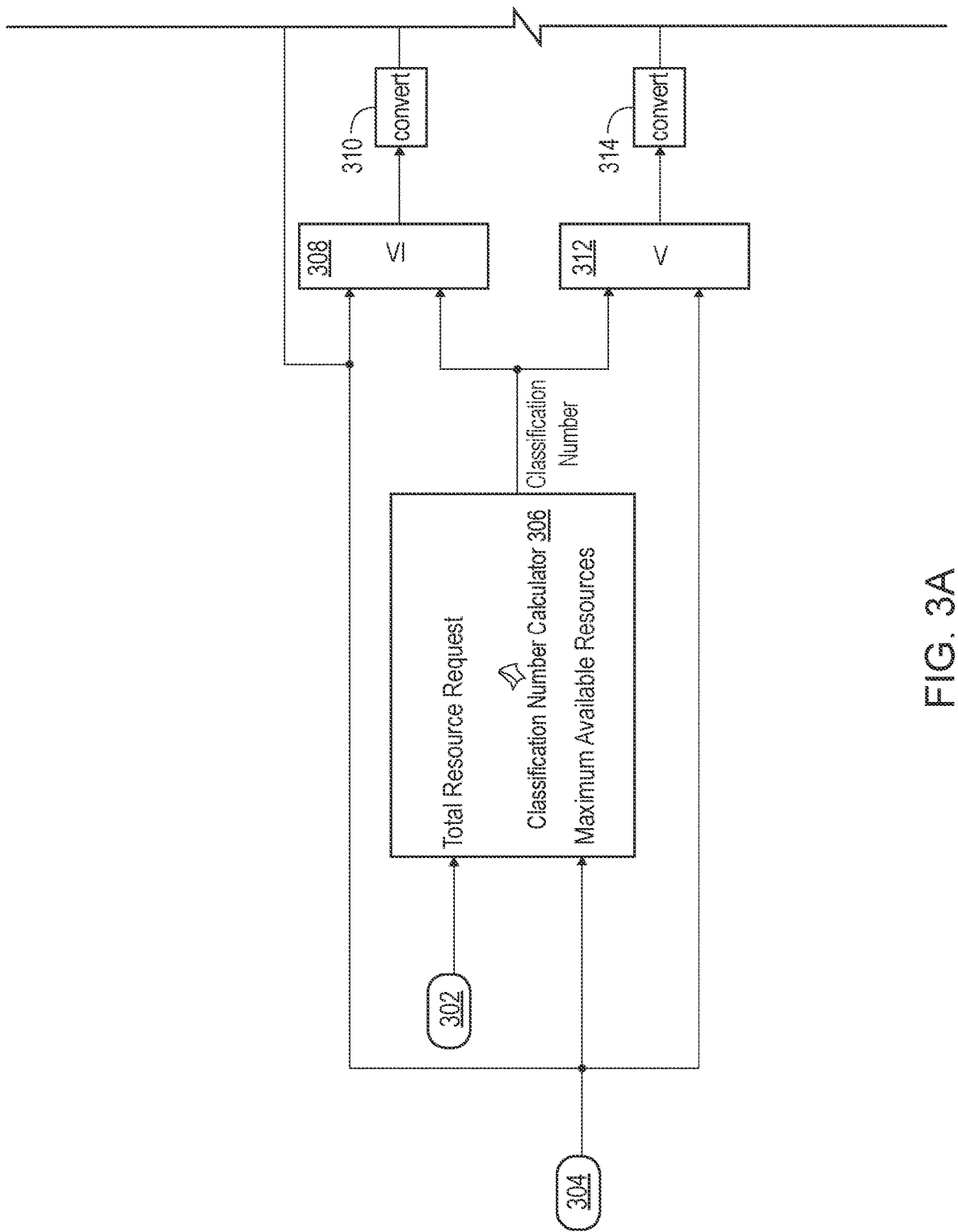
FIGS. 3A-3B are exemplary component diagrams of an architecture for the system for resource management of FIG. 1, according to one aspect.
Figure 3B:
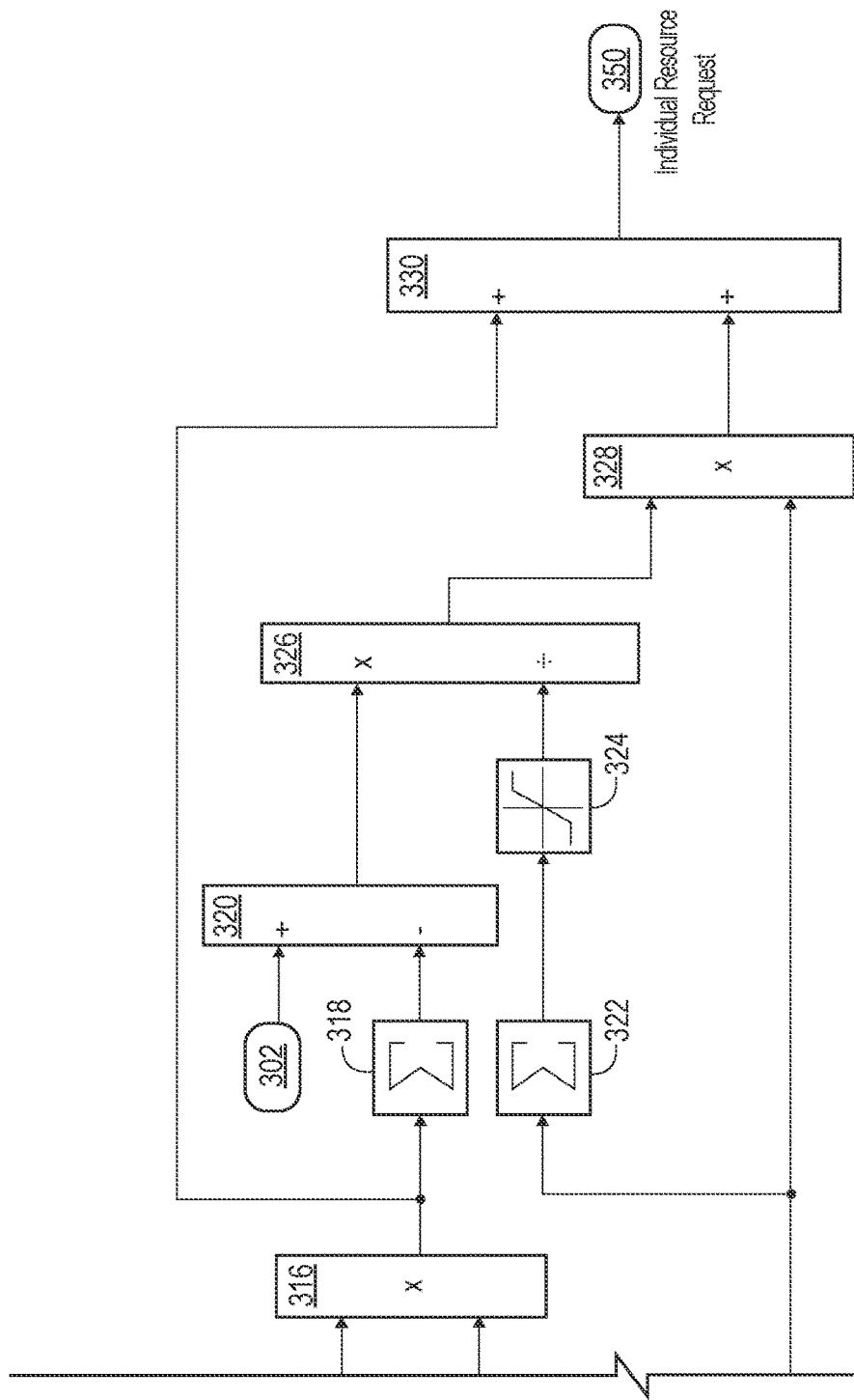

FIGS. 3A-3B are exemplary component diagrams of an architecture for the system 100 for resource management of FIG. 1, according to one aspect associated with the Sort and Settle Methodology. The architecture of FIGS. 3A-3B may be implemented via the processor 102, the memory 104, and/or the storage drive 106 of the system 100 for resource management of FIG. 1. According to one aspect, the architecture may include a classification number calculator 306 receiving a total resource request 302 and a vector of maximum available resources 304. The classification number calculator 306 may calculate the classification number using or based on the total resource request 302 and the vector of maximum available resources 304. The classification number may be compared against the vector of maximum available resources 304 at the comparators 308, 312 and converted at converters 310, 314. These conversions from converter 310 and the vector of maximum available resources 304 may be passed to multiplier 316 and summed at summer 318. Subtract 320 may subtract the sum from summer 318 from the total resource request 302. Summer 322 may sum the values from converter 314 and saturation block 324 may check to see if the values are real numbers or saturate values inclusive to a specific range. Divider 326 may divide the output of subtract 320 by the output of the saturation block 324. Multiplier 328 may multiply this output by the values from converter 314. Adder 330 may add the output from multiplier 316 and the output of multiplier 328 to generate the individual resource requests 350.

With reference to a "dinner problem" example where the total resource request P (e.g., the bill is $565), the number of resource providers N is 8 (e.g., there are eight guests splitting the bill), and the vector of maximum available resources for the N resource providers is [79, 76, 71, 60, 80, 55, 79, 80] (e.g., guests A, B, C, D, E, F, G, and H have $79, $76, $71, $60, $80, $55, $79, $80, respectively), it may be determined that the average cost is $$\frac{R}{N} = \frac{565}{8} = 70.625,$$

and thus, if possible, each guest A, B, C, D, E, F, G, H should pay $70.625. However, guests D, F do not have enough resources (e.g., money) since D has $60 and F has $55, and thus, this option is not affordable.

According to one aspect, a check may be made by the system 100 for resource management to determine whether $R > \Sigma_{i=1}^{i=N}$ maximum available resources (i). In other words, with reference to the "dinner problem" example, whether bill$> \Sigma_{i=1}^{i=number\ of\ people}$ PocketMoney(i). In this way, if the resource providers do not have enough resources as an aggregate group, then the total resource request P may be determined to be unaffordable or unreachable.

According to one aspect, a check may be made by the system 100 for resource management to determine whether $R \leq N*min$(maximum available resources (i)). In other words, with reference to the "dinner problem" example, whether bill$\leq$ number of people*min(PocketMoney (i)). In this way, if each resource provider has enough resource to pay their fair share, then the total resource request P may be determined to be affordable and may be evenly split (i.e., every guest pays an even amount of money or each resource provider provides the same amount of resources).

However, when $N*min$(maximum available resources (i)) $<R \leq \Sigma_{i=1}^{i=N}$ maximum available resources (i), the system 100 for resource management may calculate a classification number to facilitate the fairness of the split of the total resource request P. According to this aspect, guests with more money in their pocket should pay no less than guests with less money in their pocket, and all payments should be as close in value as possible. For example, each guest A, B, C, D, E, F, G, H may be requested (e.g., individual resource request) to pay [75.8, 75.8, 71, 60, 75.8, 55, 75.8, 75.8]. According to this option, the total of the individual resource requests is 565 and this satisfies the fairness definition above where guests with more money in their pocket should pay no less than guests with less money in their pocket, and all payments should be as close in value as possible.

According to one aspect, the classification number may be selected from the vector of maximum available resources for the N resource providers. The classification number may be selected such that guests with money less than or equal to the classification number just pay their respective maximum available resources, while guests with money more than the classification number may evenly split the remainder of the total resource request P (e.g., (P–Σ guests with money less than or equal to the classification number)).

Each guest's share of the bill may be outputted in 'individual resource request' and may be less than or equal to the guest's maximum available resources. Variance of 'individual resource request' may be minimized while satisfying the requirement that guest with more resource in pocket should always pay no less than guest with less resource in pocket (e.g., most-fair). Guests with resources less than or equal to the classification number may pay with all the resources in their pockets, while guests with more resources than the classification number shall evenly split the rest of the bill.

Classification Number Pseudo-Code:

According to one aspect, the classification number may be generated by the system 100 for resource management according to the following pseudo-code:

```
1  function ClassificationNum = PickClassificationNum
(TotalResourceRequest, MaximumAvailableResources)
     % Function 'PickClassificationNum' picks one number from
the array of input 'MaximumAvailableResources', so that the input
'ClassificationNum' may be split in the so called affordable and most-
fairly manner
2  u_sort = sort(MaximumAvailableResources, 'ascend');
     % sort input array 'MaximumAvailableResources' in
ascending order and store in local variable u_sort
3  u_sort_limited = zeros(length(MaximumAvailableResources),
1);
     % initialize local variable u_sort_limited to have same
dimension as MaximumAvailableResources
4  sum_sort = zeros(length(MaximumAvailableResources), 1);
5  for i = 1:length(MaximumAvailableResources)
     % initialize local variable sum_sort to have same dimension
as MaximumAvailableResources
6       u_sort_limited = min(u_sort, u_sort(i))
     % in each iteration, u_sort_limited is updated by modified
u_sort array
7       sum_sort(i) = sum(u_sort_limited)
     % assign the sum of u_sort_limited to the corresponding
element of sum_sort
8  end
     % after the above iteration, sum_sort becomes an ascending
array in sum_sort find the index of the element whose value is just
below TotalResourceRequest
```

```
 9  if isempty(sum_sort(sum_sort< TotalResourceRequest))
10       ClassificationNum = 0;
         % if the index cannot be found, ClassificationNum is 0, which
   indicates TotalResourceRequest is small enough that may be evenly
   split
11  else
12       ClassificationNum = u_sort(length(sum_sort(sum_sort<
   TotalResourceRequest)));
         % if the index may be found, u_sort element sharing the
   same index is assigned to ClassificationNum
13  end
```

Classification Number Algorithm:

```
Explained another way, the classification number may be calculated by:
    Sorting MaximumAvailableResources(i) in ascending order to obtain
MaximumAvailableResourcesSorted(i), where i = 1,2,N.
      Generating N dimension vectors:
         MaximumAvailableResourcesSortedLimited_1=[MaximumAvailable
ResourcesSorted(1), MaximumAvailableResourcesSorted(1), ...];
         MaximumAvailableResourcesSortedLimited_2=[MaximumAvailable
ResourcesSorted(1), MaximumAvailableResourcesSorted(2),
MaximumAvailableResourcesSorted(2), ...];
         MaximumAvailableResourcesSortedLimited_3=[MaximumAvailable
ResourcesSorted(1), MaximumAvailableResourcesSorted(2),
MaximumAvailableResourcesSorted(3),
MaximumAvailableResourcesSorted(3)...]; ...
         MaximumAvailableResourcesSortedLimited_N=[MaximumAvailable
ResourcesSorted(1), MaximumAvailableResourcesSorted(2),
MaximumAvailableResourcesSorted(3),
MaximumAvailableResourcesSorted(4)...,
MaximumAvailableResourcesSorted(N)]
    Generating an updated or new N dimension vector:
         SumMaximumAvailableResourcesSortedLimited(i)=sum(Maximum
    AvailableResourcesSortedLimited_i)
         SumMaximumAvailableResourcesSortedLimited(i) may be a monotonically
increasing vector, the member K with
SumMaximumAvailableResourcesSortedLimited(K+1)>= TotalResourceRequest
may be a desired index in MaximumAvailableResourcesSorted(i).
MaximumAvailableResourcesSorted(K) may be the calculated Classification Number.
According to one aspect as a boundary condition, when
SumMaximumAvailableResourcesSortedLimited(1) >= TotalResourceRequest, then
TotalResourceRequest shall be evenly split by all members; in another aspect as
another boundary condition, when
SumMaximumAvailableResourcesSortedLimited(N) < TotalResourceRequest, then
TotalResourceRequest may be beyond the affordability of all members.
```

Figure 4A:
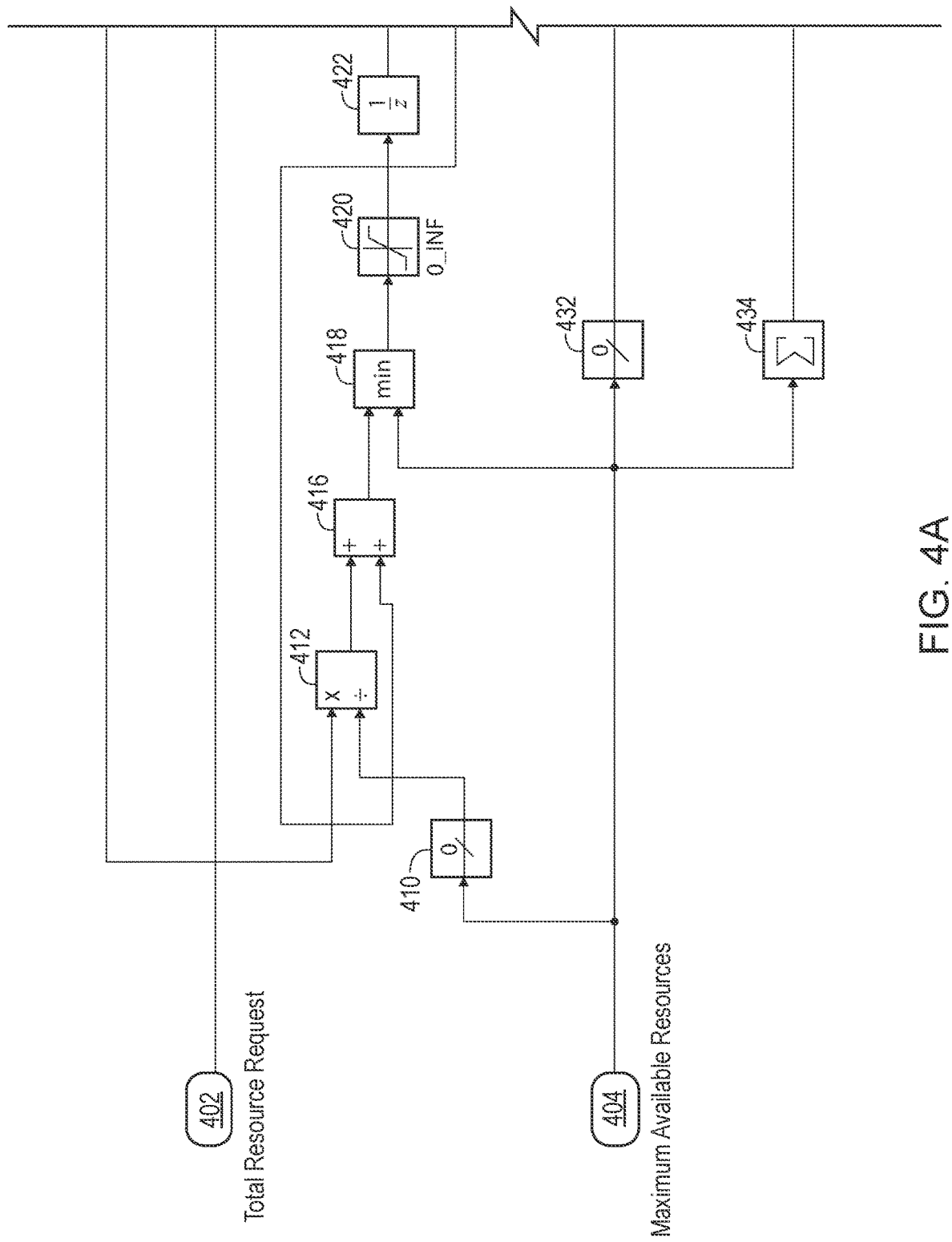
FIGS. 4A-4B are exemplary component diagrams of an architecture for the system for resource management of FIG. 1, according to one aspect.
Figure 4B:
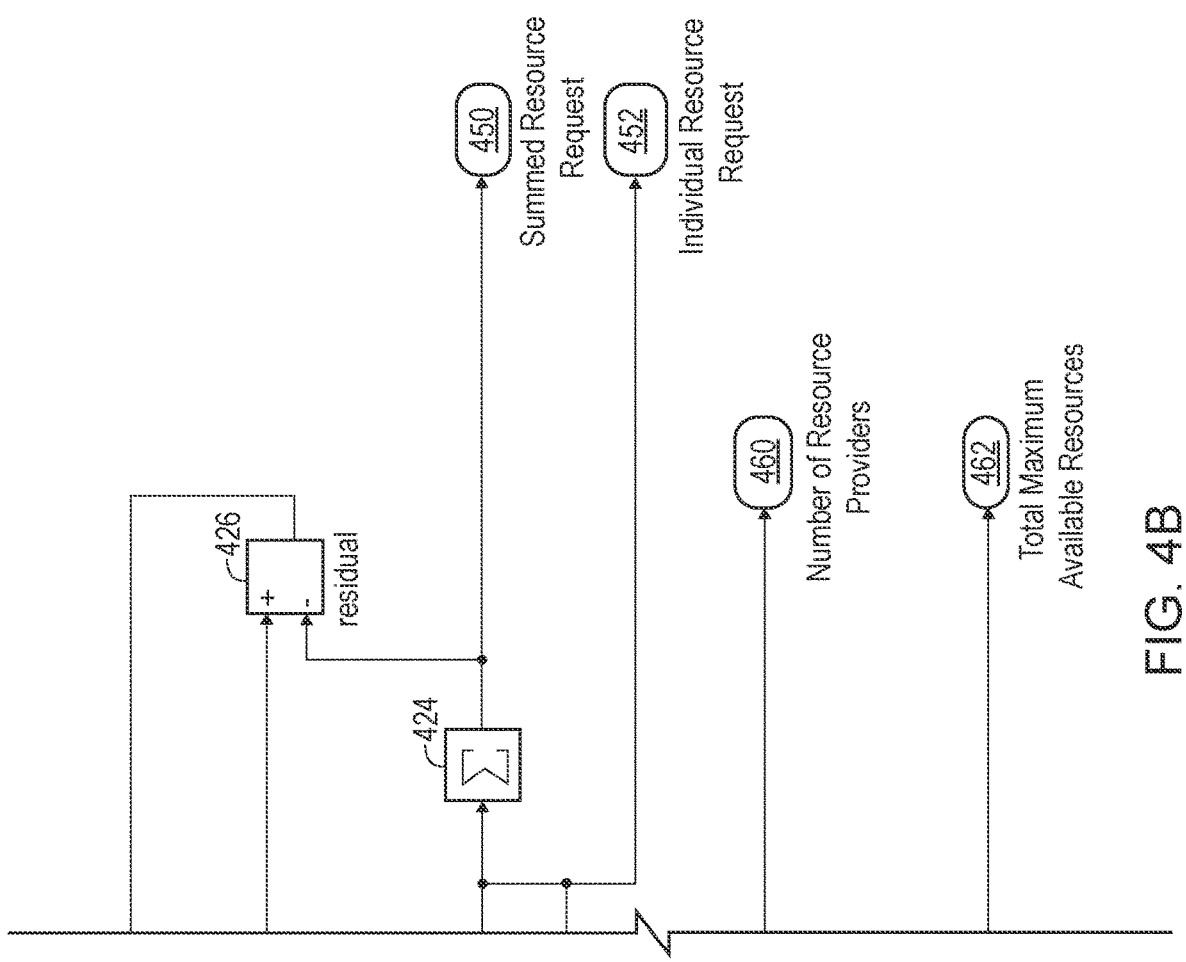

FIGS. 4A-4B are exemplary component diagrams of an architecture for the system 100 for resource management of FIG. 1, according to one aspect associated with the Residual Redistribution Methodology. The architecture of FIGS. 4A-4B may be implemented via the processor 102, the memory 104, and/or the storage drive 106 of the system 100 for resource management of FIG. 1. According to one aspect, the architecture may include a residual initialized to zero and a stored value 422 initialized to zero. The architecture may receive a total resource request 402 and a vector of maximum available resources 404. Size functions 410, 432 may determine a size of the vector of maximum available resources 404 (e.g., determining N). The output of the size functions 432 may be the number 460 of resource providers N. A summer 434 may sum the values of the vector of maximum available resources 404 to generate the total maximum or aggregate available resources 462.

The total resource request 402 and the residual may be fed to divider 412, which may divide the total resource request 402 by the residual. This output of the divider 412 and the stored value 422 may be fed to adder 416 which may sum these two values. The output of the adder 416 may be fed to minimum function 418 to determine a smaller of two between this output of the adder 416 and the vector of maximum available resources 404. The output of the minimum function 418 may be fed to a saturation block 420 to check to see if the values are real numbers. The output of the saturation block 420 may be fed to the stored value 422 to update the stored value. The output of the stored value 422 may be fed back to adder 416. The output of the stored value 422 may be fed to summer 424. The output of the summer 424 may be subtracted from the residual by subtractor 426. The output of the summer 424 may be representative of a running tally of a summed resource request 450. The output of the stored value 422 may be representative of a running tally of an array of individual resource requests 452.

Figure 5:
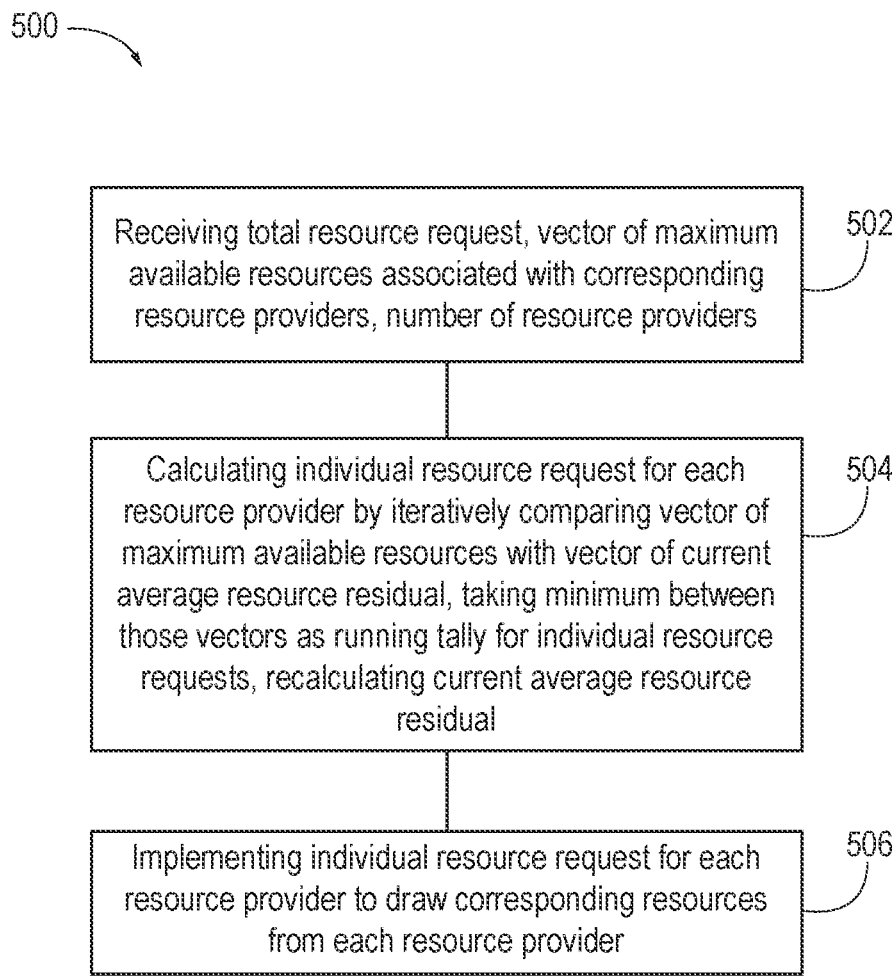
FIG. 5 is an exemplary flow diagram of a method for resource management, according to one aspect.

FIG. 5 is an exemplary flow diagram of a method for resource management, according to one aspect. According to one aspect, a computer-implemented method 500 for resource management may include receiving 502 a total resource request, a vector of two or more maximum available resources associated with two or more corresponding resource providers, and a number of resource providers, calculating 504 an individual resource request for each of the two or more resource providers by iteratively comparing the vector of two or more maximum available resources with a vector of a current average resource residual, taking a minimum between those vectors as a running tally for the individual resource requests, and recalculating the current average resource residual, and implementing 506 the individual resource request for each of the two or more resource providers to draw the corresponding resources from each of the two or more resource providers.

According to another aspect, a computer-implemented method for resource management may include executing a first method for resource management or a second first method for resource management based on available computer processing resources. The first method for resource management may include receiving a total resource request, a vector of two or more maximum available resources associated with two or more corresponding resource providers, and a number of resource providers, calculating an individual resource request for each of the two or more resource providers by iteratively comparing the vector of two or more maximum available resources with a vector of a current average resource residual, taking a minimum between those vectors as a running tally for the individual resource requests, and recalculating the current average resource residual, and implementing the individual resource request for each of the two or more resource providers to draw the corresponding resources from each of the two or more resource providers. The second method for resource management may include receiving the total resource request, the vector of two or more maximum available resources associated with two or more corresponding resource providers, and the number of resource providers, calculating the individual resource request for each of the two or more resource providers based on a classification number, and implementing the individual resource request for each of the two or more resource providers to draw the corresponding resources from each of the two or more resource providers. Any resource provider having a maximum available resource less than or equal to the classification number may be assigned an individual resource request equal to their corresponding maximum available resource.

Figure 6:
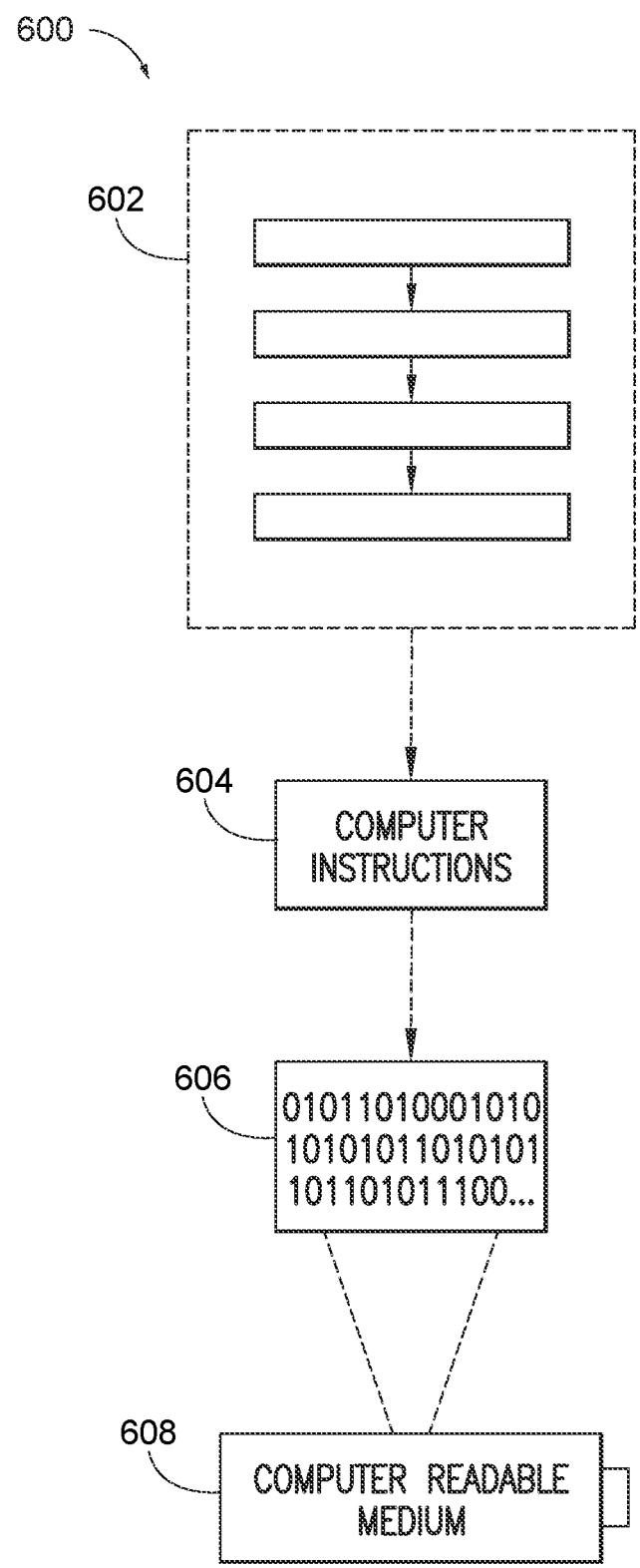
FIG. 6 is an illustration of an example computer-readable medium or computer-readable device including processor-executable instructions configured to embody one or more of the provisions set forth herein, according to one aspect.

Still another aspect involves a computer-readable medium including processor-executable instructions configured to implement one aspect of the techniques presented herein. An aspect of a computer-readable medium or a computer-readable device devised in these ways is illustrated in FIG. 6, wherein an implementation 600 includes a computer-readable medium 608, such as a CD-R, DVD-R, flash drive, a platter of a hard disk drive, etc., on which is encoded computer-readable data 606. This encoded computer-readable data 606, such as binary data including a plurality of zero's and one's as shown in 606, in turn includes a set of processor-executable computer instructions 604 configured to operate according to one or more of the principles set forth herein. In this implementation 600, the processor-executable computer instructions 604 may be configured to perform a method 602, such as the computer-implemented method 200 of FIG. 2 or the computer-implemented method 500 of FIG. 5. In another aspect, the processor-executable computer instructions 604 may be configured to implement a system, such as the system 100 of FIG. 1. Many such computer-readable media may be devised by those of ordinary skill in the art that are configured to operate in accordance with the techniques presented herein.

As used in this application, the terms "component", "module," "system", "interface", and the like are generally intended to refer to a computer-related entity, either hardware, a combination of hardware and software, software, or software in execution. For example, a component may be, but is not limited to being, a process running on a processor, a processing unit, an object, an executable, a thread of execution, a program, or a computer. By way of illustration, both an application running on a controller and the controller may be a component. One or more components residing within a process or thread of execution and a component may be localized on one computer or distributed between two or more computers.

Further, the claimed subject matter is implemented as a method, apparatus, or article of manufacture using standard programming or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Figure 7:
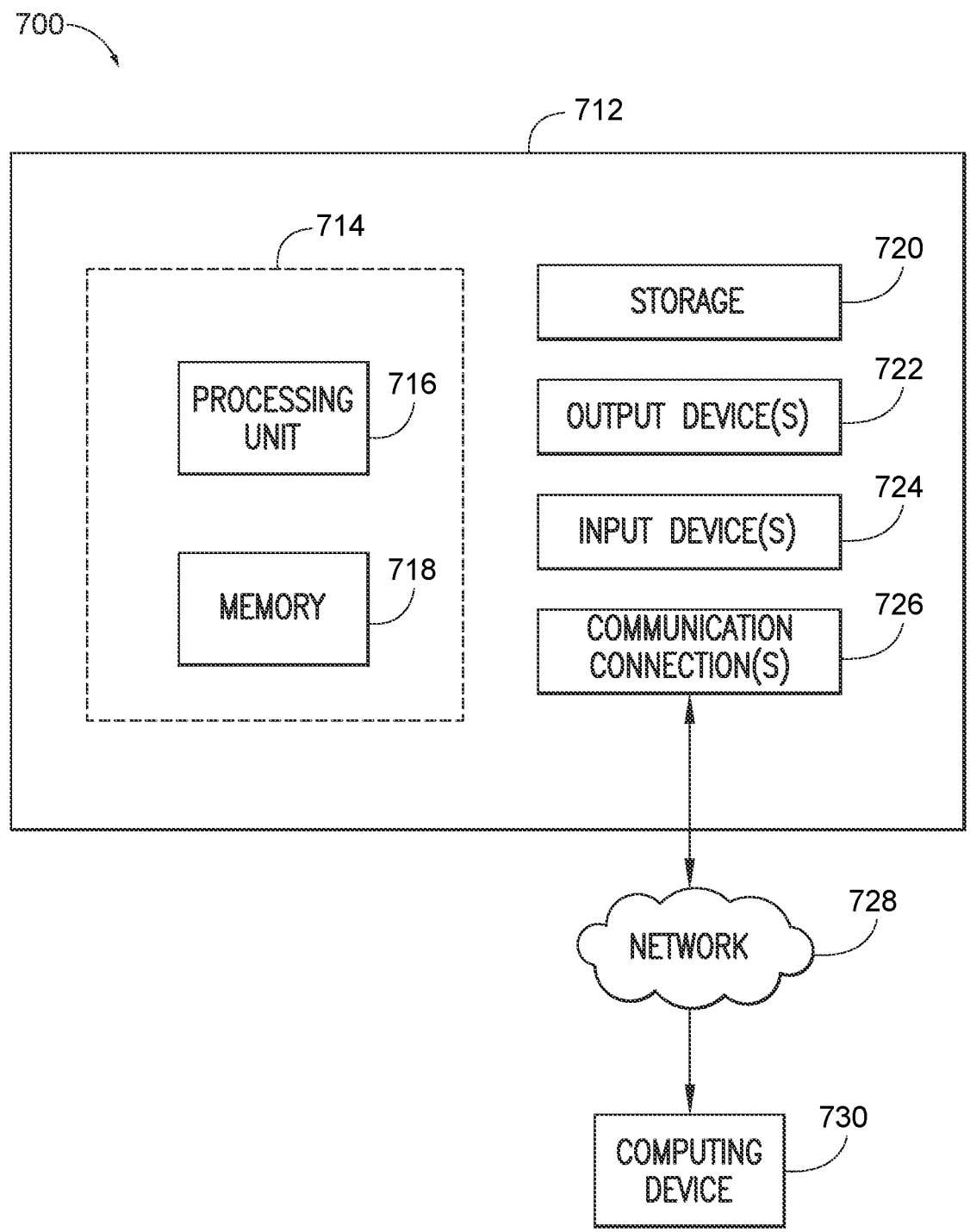
FIG. 7 is an illustration of an example computing environment where one or more of the provisions set forth herein are implemented, according to one aspect.

FIG. 7 and the following discussion provide a description of a suitable computing environment to implement aspects of one or more of the provisions set forth herein. The operating environment of FIG. 7 is merely one example of a suitable operating environment and is not intended to suggest any limitation as to the scope of use or functionality of the operating environment. Example computing devices include, but are not limited to, personal computers, server computers, hand-held or laptop devices, mobile devices, such as mobile phones, Personal Digital Assistants (PDAs), media players, and the like, multiprocessor systems, consumer electronics, mini computers, mainframe computers, distributed computing environments that include any of the above systems or devices, etc.

Generally, aspects are described in the general context of "computer readable instructions" being executed by one or more computing devices. Computer readable instructions may be distributed via computer readable media as will be discussed below. Computer readable instructions may be implemented as program modules, such as functions, objects, Application Programming Interfaces (APIs), data structures, and the like, that perform one or more tasks or implement one or more abstract data types. Typically, the functionality of the computer readable instructions are combined or distributed as desired in various environments.

FIG. 7 illustrates a system 700 including a computing device 712 configured to implement one aspect provided herein. In one configuration, the computing device 712 includes at least one processing unit 716 and memory 718. Depending on the exact configuration and type of computing device, memory 718 may be volatile, such as RAM, non-volatile, such as ROM, flash memory, etc., or a combination of the two. This configuration is illustrated in FIG. 7 by dashed line 714.

In other aspects, the computing device 712 includes additional features or functionality. For example, the computing device 712 may include additional storage such as removable storage or non-removable storage, including, but not limited to, magnetic storage, optical storage, etc. Such additional storage is illustrated in FIG. 7 by storage 720. In one aspect, computer readable instructions to implement one aspect provided herein are in storage 720. Storage 720 may store other computer readable instructions to implement an operating system, an application program, etc. Computer readable instructions may be loaded in memory 718 for execution by the at least one processing unit 716, for example.

The term "computer readable media" as used herein includes computer storage media. Computer storage media includes volatile and nonvolatile, removable and non-removable media implemented in any method or technology for storage of information such as computer readable instructions or other data. Memory 718 and storage 720 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which may be used to store the desired information and which may be accessed by the computing device 712. Any such computer storage media is part of the computing device 712.

The term "computer readable media" includes communication media. Communication media typically embodies computer readable instructions or other data in a "modulated data signal" such as a carrier wave or other transport mechanism and includes any information delivery media. The term "modulated data signal" includes a signal that has one or more of its characteristics set or changed in such a manner as to encode information in the signal.

The computing device 712 includes input device(s) 724 such as keyboard, mouse, pen, voice input device, touch input device, infrared cameras, video input devices, or any other input device. Output device(s) 722 such as one or more displays, speakers, printers, or any other output device may be included with the computing device 712. Input device(s) 724 and output device(s) 722 may be connected to the computing device 712 via a wired connection, wireless connection, or any combination thereof. In one aspect, an input device or an output device from another computing device may be used as input device(s) 724 or output device(s) 722 for the computing device 712. The computing device 712 may include communication connection(s) 726 to facilitate communications with one or more other devices 730, such as through network 728, for example.

Although the subject matter has been described in language specific to structural features or methodological acts, it is to be understood that the subject matter of the appended claims is not necessarily limited to the specific features or acts described above. Rather, the specific features and acts described above are disclosed as example aspects.

Various operations of aspects are provided herein. The order in which one or more or all of the operations are described should not be construed as to imply that these operations are necessarily order dependent. Alternative ordering will be appreciated based on this description. Further, not all operations may necessarily be present in each aspect provided herein.

As used in this application, "or" is intended to mean an inclusive "or" rather than an exclusive "or". Further, an inclusive "or" may include any combination thereof (e.g., A, B, or any combination thereof). In addition, "a" and "an" as used in this application are generally construed to mean "one or more" unless specified otherwise or clear from context to be directed to a singular form. Additionally, at least one of A and B and/or the like generally means A or B or both A and B. Further, to the extent that "includes", "having", "has", "with", or variants thereof are used in either the detailed description or the claims, such terms are intended to be inclusive in a manner similar to the term "comprising".

Further, unless specified otherwise, "first", "second", or the like are not intended to imply a temporal aspect, a spatial aspect, an ordering, etc. Rather, such terms are merely used as identifiers, names, etc. for features, elements, items, etc. For example, a first channel and a second channel generally correspond to channel A and channel B or two different or two identical channels or the same channel. Additionally, "comprising", "comprises", "including", "includes", or the like generally means comprising or including, but not limited to.

It will be appreciated that various of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A system for resource management, comprising:
a memory storing one or more instructions; and
a processor executing one or more of the instructions stored on the memory to perform:
receiving a total resource request, a vector of two or more maximum available resources associated with two or more corresponding resource providers, and a number of resource providers;
calculating an individual resource request for each of the two or more resource providers by comparing vectors; and
implementing the individual resource request for each of the two or more resource providers to draw the corresponding resources from each of the two or more resource providers.

2. The system for resource management of claim 1, wherein the individual resource request for each of the two or more resource providers is set to the corresponding maximum available resources when a sum of the vector of two or more maximum available resources is less than the total resource request.

3. The system for resource management of claim 1, wherein the individual resource request for each of the two or more resource providers is equal when possible.

4. The system for resource management of claim 1, wherein the current average resource residual is initialized as zero.

5. The system for resource management of claim 1, wherein the calculating the individual resource request for each of the two or more resource providers is associated with an iterative threshold.

6. The system for resource management of claim 5, wherein the iterative threshold is two iterations or three iterations.

7. A system for resource management, comprising:
a memory storing one or more instructions;
a processor executing one or more of the instructions stored on the memory to perform:
receiving a total resource request, a vector of two or more maximum available resources associated with two or more corresponding resource providers, and a number of resource providers;
calculating an individual resource request for each of the two or more resource providers by iteratively comparing the vector of two or more maximum available resources with a vector of a current average resource residual, taking a minimum between those vectors as a running tally for the individual resource requests, and recalculating the current average resource residual; and
implementing the individual resource request for each of the two or more resource providers to draw the corresponding resources from each of the two or more resource providers.

8. The system for resource management of claim 7, wherein the individual resource request for each of the two or more resource providers is set to the corresponding maximum available resources when a sum of the vector of two or more maximum available resources is less than the total resource request.

9. The system for resource management of claim 7, wherein the individual resource request for each of the two or more resource providers is equal when possible.

10. The system for resource management of claim 7, wherein the current average resource residual is initialized as zero.

11. The system for resource management of claim 7, wherein the calculating the individual resource request for each of the two or more resource providers is associated with an iterative threshold.

12. The system for resource management of claim 11, wherein the iterative threshold is two iterations or three iterations.

13. A system for resource management, comprising:
a memory storing one or more instructions;
a processor executing one or more of the instructions stored on the memory to perform:
receiving a total resource request, a vector of two or more maximum available resources associated with two or more corresponding resource providers, and a number of resource providers;
calculating an individual resource request for each of the two or more resource providers based on a classification number; and
implementing the individual resource request for each of the two or more resource providers to draw the corresponding resources from each of the two or more resource providers.

14. The system for resource management of claim 13, wherein any resource provider having a maximum available resource less than or equal to the classification number is assigned an individual resource request equal to their corresponding maximum available resource.

15. The system for resource management of claim 13, wherein remaining resource providers having a maximum available resource greater than the classification number are assigned individual resource requests which evenly split the total resource request minus maximum available resources for the resource providers having the maximum available resource less than or equal to the classification number.

16. The system for resource management of claim 13, wherein the individual resource request for each of the two or more resource providers is set to the corresponding maximum available resources when a sum of the vector of two or more maximum available resources is less than the total resource request.

17. The system for resource management of claim 13, wherein the individual resource request for each of the two or more resource providers is equal when possible.

18. The system for resource management of claim 13, wherein the classification number is calculated by sorting the vector of two or more maximum available resources.

19. The system for resource management of claim 16, wherein the classification number is calculated by generating a number of dimension vectors equal to the number of resource providers based on the sorted vector of two or more maximum available resources.

20. The system for resource management of claim 17, wherein the classification number is calculated by generating an updated dimension vector based on the number of dimension vectors.

21. The system for resource management of claim 18, wherein the updated dimension vector may be a monotonically increasing vector.

* * * * *